(12) United States Patent
Huang et al.

(10) Patent No.: US 9,435,646 B2
(45) Date of Patent: Sep. 6, 2016

(54) DISPLACEMENT DETECTION DEVICE AND OPERATING METHOD THEREOF

(71) Applicant: PixArt Imaging Inc., Hsin-Chu County (TW)

(72) Inventors: Yu-Hao Huang, Hsin-Chu (TW);
Hsin-Chia Chen, Hsin-Chu (TW);
Ming-Tsan Kao, Hsin-Chu (TW);
Sen-Huang Huang, Hsin-Chu (TW)

(73) Assignee: Pixart Imaging Inc, Hsin-Chu (TW)

( * ) Notice: Subject to any disclaimer, the term of this patent is extended or adjusted under 35 U.S.C. 154(b) by 673 days.

(21) Appl. No.: 13/758,304

(22) Filed: Feb. 4, 2013

(65) Prior Publication Data
US 2013/0229514 A1    Sep. 5, 2013

(30) Foreign Application Priority Data

Mar. 1, 2012    (TW) .............................. 101106680 A

(51) Int. Cl.
| | |
|---|---|
| *G01C 11/02* | (2006.01) |
| *G06F 1/32* | (2006.01) |
| *G06F 3/038* | (2013.01) |
| *G06F 3/0354* | (2013.01) |
| *G06F 3/03* | (2006.01) |

(52) U.S. Cl.
CPC ............. *G01C 11/02* (2013.01); *G06F 1/3259* (2013.01); *G06F 3/0317* (2013.01); *G06F 3/0383* (2013.01); *G06F 3/03543* (2013.01); *G06F 3/03547* (2013.01); *G06F 2203/0338* (2013.01); *Y02B 60/1253* (2013.01)

(58) Field of Classification Search
CPC .............. G06F 1/3259; G06F 3/0383; G06F 3/03543; G06F 3/03547
See application file for complete search history.

(56) References Cited

U.S. PATENT DOCUMENTS

| | | | |
|---|---|---|---|
| 2004/0021637 A1* | 2/2004 | Ahn ............................... | 345/165 |
| 2007/0132734 A1* | 6/2007 | Kwak et al. ................... | 345/166 |
| 2007/0222756 A1* | 9/2007 | Wu ..................... | G06F 3/03543 |
| | | | 345/165 |

FOREIGN PATENT DOCUMENTS

| | | |
|---|---|---|
| TW | 200525437 A | 8/2005 |
| TW | I244044 B | 11/2005 |

* cited by examiner

*Primary Examiner* — Shaheda Abdin
(74) *Attorney, Agent, or Firm* — Hauptman Ham, LLP

(57) ABSTRACT

There is provided a displacement detection device including an image sensor, a light source, a light control unit and a processing unit. The image sensor captures image frames at a sampling frequency. The light source provides, in a speed mode, light for the image sensor in capturing the image frames. The light control unit controls the light source with the speed mode to turn on at a lighting frequency or to turn off serially. The processing unit calculates a displacement according to the image frames captured when the light source turns on to be served as an estimated displacement for an interval during which the light source turns off. There is further provided an operating method of a displacement detection device.

16 Claims, 5 Drawing Sheets

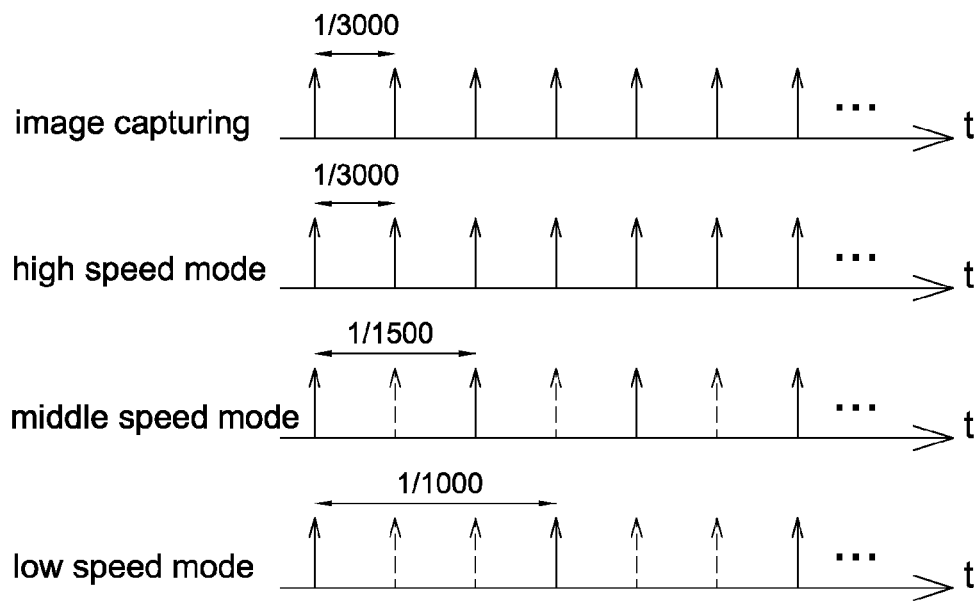
FIG. 3A
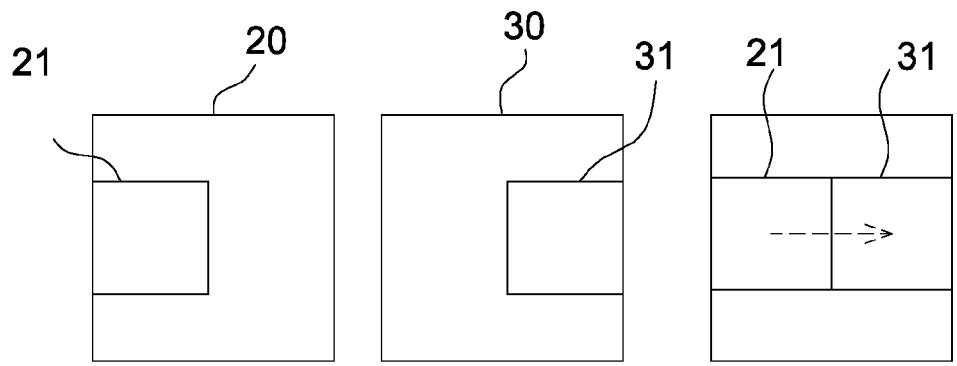
FIG. 3B
|  | valid frame rate (FPS) | max. detectable speed (IPS) |
|---|---|---|
| high speed | 3000 | 37.8 |
| middle speed | 1500 | 18.9 |
| low speed | 1000 | 12.6 |
FIG. 3C

| | lighting number of times per second | max. detectable speed (IPS) |
|---|---|---|
| high speed | 1000 | 37.8 |
| middle speed | 1000 | 18.9 |
| low speed | 1000 | 12.6 |

DISPLACEMENT DETECTION DEVICE AND OPERATING METHOD THEREOF

CROSS REFERENCE TO RELATED APPLICATION

This application claims the priority benefit of Taiwan Patent Application Serial Number 101106680, filed on Mar. 1, 2012, the full disclosure of which is incorporated herein by reference.

BACKGROUND

1. Field of the Disclosure

This disclosure generally relates to an interactive device and, more particularly, to a displacement detection device and operating method thereof.

2. Description of the Related Art

As a wireless optical mouse does not have a signal line connected to a host, the operational convenience thereof is significantly improved. Especially for an input device of portable computers, the wireless optical mouse gradually replaces the conventional wired optical mouse. However, as the wireless optical mouse generally includes a plurality of active components such as a light source, a digital signal processor, an image sensor and a wireless transmission unit, the total power consumption is large and a service life of the battery is insufficient.

To solve this problem, conventionally it is able to change a sampling frequency and an exposure time of the image sensor so as to reduce the consuming power of a wireless optical mouse. However in practical use, this method can have at least the following problems. As the exposure time of the image sensor is changed with a moving speed of the wireless optical mouse, a total intensity of the image frame being captured can have a large variation resulting in a poor stability.

Another choice to reduce the power consumption of a wireless optical mouse is to change a lighting frequency of the light source. For example referring to FIG. 1, the lighting frequency of the light source may be fixed as 3000 frames/second, 1500 frames/second or 1000 frames/second according to the displacement of the wireless optical mouse. However, in this operating method different consumption current is required at different lighting frequencies, e.g. the consumption current in a high speed mode is triple times of that in a low speed mode.

Accordingly, the present disclosure further provides a displacement detection device and operating method thereof that may change a lighting pattern of the light source according to different displacement so as to further reduce the total power consumption of the displacement detection device.

SUMMARY

It is an object of the present disclosure to provide a displacement detection device and operating method thereof that may adjust a lighting pattern of the light source according to different displacement or moving speed such that each lighting pattern may have identical low power consumption.

The present disclosure provides a displacement detection device including an image sensor, a light source, a light control unit and a processing unit. The image sensor is configured to capture image frames at a sampling frequency. The light source provides, in at least one speed mode, light for the image sensor in capturing the image frames. The light control unit is configured to control the light source with the speed mode to turn on at a lighting frequency or to turn off serially. The processing unit is configured to calculate a displacement according to the image frames captured when the light source turns on to be served as an estimated displacement for an interval during which the light source turns off.

The present disclosure further provides an operating method of a displacement detection device including the steps of: capturing, with an image sensor, image frames at a sampling frequency; controlling a light source to turn on at at least one lighting frequency or to turn off serially; and calculating, with a processing unit, a displacement according to the image frames captured when the light source turns on to be served as an estimated displacement for an interval during which the light source turns off.

The present disclosure further provides an operating method of a displacement detection device including the steps of: capturing, with an image sensor, image frames at a sampling frequency; turning on a light source synchronizing to the sampling frequency; calculating, with a processing unit, a displacement according to the image frames captured by the image sensor to accordingly determine a speed mode of the light source; controlling the light source to turn on in the speed mode or to turn off serially; and calculating, with the processing unit, a displacement according to the image frames captured when the light source turns on to be served as an estimated displacement for an interval during which the light source turns off.

In the embodiment of the present disclosure, the light source turns on corresponding to N successive image frames and next turns off corresponding to M successive image frames, wherein N and M are integers.

In an aspect, the displacement detection device further includes a transmission interface configured to output the displacement and the estimated displacement at a report rate, wherein (M+N) is preferably smaller than or equal to a quotient calculated by dividing a frame rate of the light source by the report rate and N is preferably larger than 4.

In an aspect, the processing unit further calculates an image quality of N image frames and a value of N is increased when the image quality is poor, e.g. lower than a quality threshold.

In an aspect, the lighting number of times per second of the light source is the same in different speed modes, and a value of N in a low speed mode is larger than a value of N in a high speed mode.

In an aspect, the processing unit further real-timely switches the speed mode according to the displacement.

In the displacement detection device and the operating method of the present disclosure, as the value of N may be adjusted according to a speed mode of the light source and an image quality of the image frames, the calculation accuracy of the displacement can be effectively increased. As a lighting number of times per second of the light source may be designed equal to the lighting number of times per second of the lowest speed mode, the total power consumption can be effectively reduced.

BRIEF DESCRIPTION OF THE DRAWINGS

Other objects, advantages, and novel features of the present disclosure will become more apparent from the following detailed description when taken in conjunction with the accompanying drawings.

FIG. 3A shows different speed modes of the light source of the displacement detection device according to the embodiment of the present disclosure.

FIG. 3B shows a schematic diagram of calculating a maximum detectable displacement by the displacement detection device according to the embodiment of the present disclosure.

FIG. 3C shows the valid frame rate and the corresponding maximum detectable speed in the displacement detection device according to the embodiment of the present disclosure.

DETAILED DESCRIPTION OF THE EMBODIMENT

It should be noted that, wherever possible, the same reference numbers will be used throughout the drawings to refer to the same or like parts.

Figure 1:
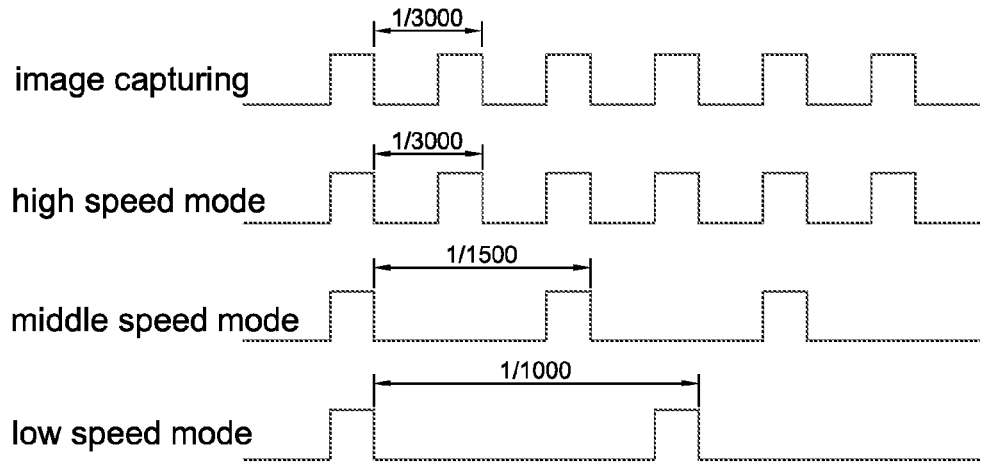
FIG. 1 shows a schematic diagram of the image capturing and the lighting of the light source of the conventional optical mouse.
Figure 2A:
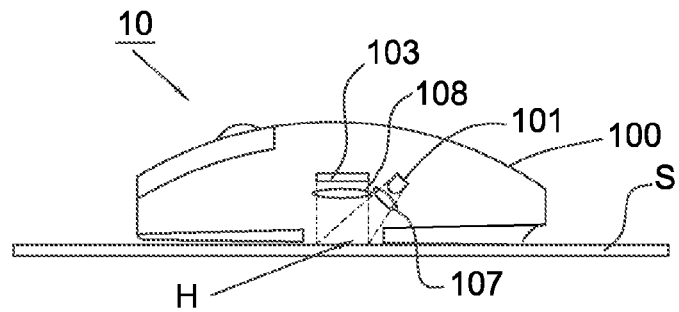
FIG. 2A shows a schematic diagram of the displacement detection device according to an embodiment of the present disclosure.
Figure 2B:
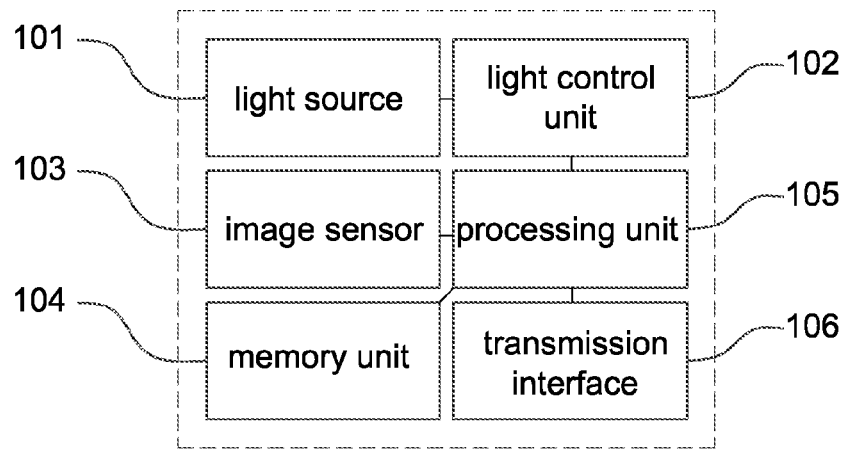
FIG. 2B shows a schematic block diagram of the displacement detection device according to an embodiment of the present disclosure.

Referring to FIGS. 2A and 2B, FIG. 2A shows a schematic diagram of the displacement detection device according to an embodiment of the present disclosure; and FIG. 2B shows a schematic block diagram of the displacement detection device according to an embodiment of the present disclosure, wherein although the displacement detection device 10 is shown as an optical mouse herein, it is not used to limit the present disclosure. For example, the displacement detection device 10 may also be an optical finger mouse (OFM).

The displacement detection device 10 includes a light source 101, a light control unit 102, an image sensor 103, a memory unit 104, a processing unit 105 and a transmission interface 106. In other embodiments, the displacement detection device 10 may further include an optical component 107 configured to adjust an illumination region of the light source 101 and an optical component 108 configured to adjust a sensing efficiency of the image sensor 103.

The image sensor 103 may be a CCD image sensor, a CMOS image sensor or other sensing devices configured to capture image data and the image sensor 103 may capture image frames at a fixed sampling frequency.

The light source 101 may be a light emitting diode or a laser diode and emits infrared light or invisible light in at least one speed mode configured to provide light for the image sensor 103 in capturing the image frames. For example, the light source 101 illuminates a work surface S through an opening H at the bottom surface of a housing 100 of the displacement detection device 10. In addition, when the displacement detection device 10 is an optical finger mouse, the light source 101 is configured to illuminate a finger surface.

The light control unit 102 is configured to control the light source 101 to operate in different speed modes to turn on at at least one lighting frequency or to turn off serially. For example, in a selected speed mode the light source 101 is controlled to illuminate corresponding to (e.g. synchronizing or not synchronizing) a sampling frequency of the image sensor 103. The light source 101 is controlled to turn on corresponding to N successive image frames and next turn off corresponding to M successive image frames alternatively so as to reduce the consuming power of the light source 101 within an interval of the M image frames, wherein a lighting number of times per second of the light source 101 is preferably identical in different speed modes (described later).

The memory unit 104 is coupled to the processing unit 105 and configured to store the displacement (or speed) threshold, the quality threshold and other system parameters.

The processing unit 105 may calculate a displacement or a moving speed according to the correlation between two image frames, compare a current displacement with the displacement threshold (or compare a current moving speed with the speed threshold), and controls the light source 101 through the light control unit 102 according to a comparison result so as to switch between different speed modes, wherein the processing unit 105 may be any processor, such as a digital signal processor (DSP), capable of processing digital image data without any limitation. In the present embodiment, the processing unit 105 calculates a displacement according to the image frames captured when the light source 101 turns on and the displacement may be served as an estimated displacement for an interval during which the light source 101 turns off. For example in one embodiment, the processing unit 105 may calculate a displacement or an average displacement according to the N image frames to be served as an estimated displacement for an interval of the M image frames such that the displacement in the interval of the M image frames is not required to be calculated; that is, the image frames captured in the interval during which the light source 101 turns off may be ignored. The processing unit 105 may switch the speed mode according to the displacement. In addition, the processing unit 105 may further determine a value of N. For example, the processing unit 105 may calculate an image quality of the N image frames and increase the value of N when the image quality is lower than a quality threshold; that is, when the image quality is poor, it is preferably to successively capture more valid image frames to prevent from obtaining an improper estimated displacement, wherein the definition of the image quality is well known and thus details thereof are not described herein. In addition, the processing unit 105 may control the light source 101 through the light control unit 102 to select a larger N in a low speed mode than in a high speed mode.

The transmission interface 106 wired or wirelessly transmits the motion information (e.g. the displacement, average displacement or moving speed) and the estimated motion information (e.g. the estimated displacement, estimated average displacement or estimated moving speed) to an external electronic device, e.g. a computer system or an electronic system having a display unit, at a report rate for corresponding control, wherein the transmission interface 106 may be a wired or wireless transmission interface and have a report rate of 125 times/second or 120 times/second, but not limited thereto.

First, different speed modes of the light source 101 in the displacement detection device 10 of the present disclosure are described. Referring to FIG. 3A, it shows a schematic diagram of three speed modes of the light source 101 and the image capturing of the image sensor 103 in the embodiment of the present disclosure, wherein each speed mode corresponds to a lighting frequency. For example in this embodiment, it is assumed that an image sampling period is $\frac{1}{3000}$ second, a lighting period of high speed mode is $\frac{1}{3000}$ second, a lighting period of middle speed mode is $\frac{1}{1500}$ second and a lighting period of low speed mode is $\frac{1}{1000}$ second, wherein the lighting periods are multiple times of and synchronized to the image sampling period; that is, the light source 101 provides light for the image sensor 103 in capturing image frames. In this manner, although the image sensor 103 captures the image frames at a fixed sampling frequency, as the light source 101 is controlled by the light control unit 102 not to turn on each time an image frame is captured, a valid image frame captured by the image sensor 13 is determined by the lighting period of the light source 101, wherein the valid image frame referred herein is shown by solid arrows (i.e. light source turning on) in FIG. 3A and dashed arrows indicate the turning off of the light source 101 such that the image sensor 103 is unable to capture the valid image frame (i.e. capturing an invalid image frame). The processing unit 105 calculates the displacement and the moving speed according to the valid image frames captured by the image sensor 103. It is appreciated that values of the image sampling period (or sampling frequency) and the lighting period (or lighting frequency) shown in FIG. 3A are only exemplary and not used to limit the present disclosure.

Referring to FIGS. 3A and 3B, next the maximum detectable displacement and the maximum detectable speed between two valid image frames that can be detected by the processing unit 105 are described. In one embodiment, the image sensor 103 captures two valid image frames, e.g. a first image frame 20 and a second image frame 30, corresponding to the turning on of the light source 101. The processing unit 105 selects a reference search block 21 in the first image frame 20 and selects a search block 31 in the second image frame 30. The processing unit 105 then calculates a distance between the reference search block 21 and the search block 31 to be served as a current displacement detected by the displacement detection device 10. For simplification, only displacement in X-axis (e.g. the horizontal direction in the figure) is considered in FIG. 3B and both X-axis component and Y-axis component may be included in actual operation. The maximum detectable displacement may be obtained when the reference search block 21 locates at the most left side of the first image frame 20 and the search block 31 locates at the most right side of the second image frame 30. In this embodiment, it is assumed that every image frame has 16×16 pixels (i.e. the size of a sensing array of the image sensor), and the search block 31 and the reference search block 21 have 8×8 pixels, and thus the maximum detectable displacement between two valid image frames that the processing unit 105 may detect is 8-pixels distance (i.e. maximum detectable pixel numbers). As the maximum detectable displacement is determined according to the size of every image frame, it is not affected by the lighting frequency of the light source 101; that is, the maximum detectable displacement is always the same in every speed mode of the light source 101.

Accordingly, when a displacement of the displacement detection device 10 between two successive valid image frames exceeds 8-pixels distance, the light source 101 has to shorten the lighting period such that the processing unit 105 is able to detect the displacement. In other words, when a displacement of the displacement detection device 10 exceeds the maximum detectable displacement, the processing unit 105 is unable to calculate the displacement such that the lighting period of the light source 101 has to be shortened so that the displacement detection device 10 can operate normally. Therefore, the processing unit 105 may control the light source 101 to enter different speed modes, e.g. a high speed mode, a middle speed mode or a low speed mode, according to the displacement calculated thereby, such as the displacement mentioned above. It is appreciated that each value referred in this embodiment is only an exemplary and not used to limit the present disclosure.

However, the maximum detectable speed in different speed modes may be different. For example, it is assumed that each pixel has a pixel size 40×40 micrometer and thus a maximum detectable speed in each speed mode may be calculated as the maximum detectable pixel numbers×pixel size×frame rate. Therefore, the maximum detectable speed in the high speed mode equals 8×40×3000=37.8 inches/second (IPS). Similarly, maximum detectable speeds of the middle speed mode and the low speed mode are shown in FIG. 3C, wherein the valid frame rate is a reciprocal of the lighting period of the light source 101.

In order to further reduce the power consumption of the light source 101 of the displacement detection device 10, in the present disclosure a lighting number of times per second of the light source 101 in the high speed mode and middle speed mode is designed to be identical to that in the low speed mode. Therefore, the light source 101 may emit light in the lowest lighting number of times per second so as to effectively reduce the power consumption thereof.

Figures 4A, 4B:
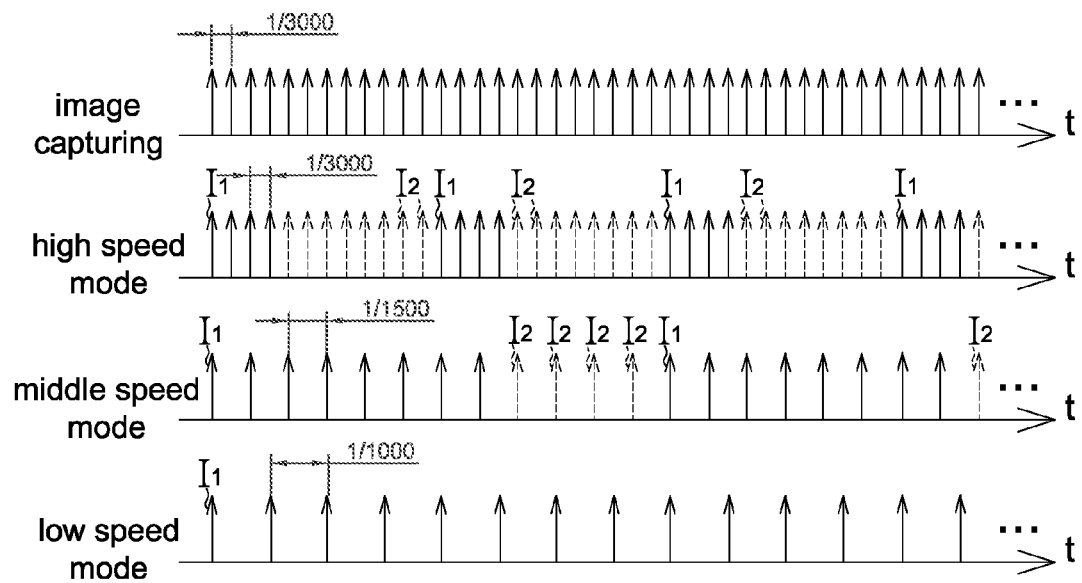
FIG. 4A shows a schematic diagram of the image capturing and the lighting of the light source of the displacement detection device according to the embodiment of the present disclosure.
FIG. 4B shows the lighting number of times per second of the light source and the corresponding maximum detectable speed in the displacement detection device according to the embodiment of the present disclosure.

Referring to FIG. 4A, it shows a schematic diagram of the image capturing and the lighting of the light source of the displacement detection device 10 according to the embodiment of the present disclosure. The speed mode of the light source 101 is determined at first. The image sensor 103 captures image frames at a fixed sampling frequency (e.g. 3000 frames/second) and the light source 101 successively illuminates synchronizing to the sampling frequency. The processing unit 105 calculates a displacement according to the image frames captured by the image sensor 103 and determines a speed mode, e.g. a high speed mode, a middle speed mode or a low speed mode, according to a comparison result of comparing the displacement with at least one displacement threshold. Next, the processing unit 105 notifies the light control unit 102 to control the light source 101 with the selected speed mode to illuminate in different lighting patterns; for example, turning on corresponding to N successive image frames to allow the image sensor 103 to capture N valid image frames within an interval of the N image frames and next turning off corresponding to M successive image frames such that the image sensor 103 is not able to capture the valid image frame within an interval of the M image frames. For example in FIG. 4A, $I_1$ indicates valid image frames corresponding to the N image frames and $I_2$ indicates invalid image frames corresponding to the M image frames. For example in FIG. 4A, in the high speed mode the light source 101 turns on corresponding to 4 successive image frames and then turns off corresponding to 8 successive image frames; in the middle speed mode the light source 101 turns on corresponding to 8 successive image frames and then turns off corresponding to 4 successive image frames; and in the low speed mode the light source 101 turns on at the fixed lighting frequency. It is appreciated that in FIG. 4A numbers of the turning on (i.e.

N) and the turning off (i.e. M) of the light source 101 are only exemplary embodiments but not limitations to the present disclosure.

The processing unit 105 then calculates a displacement according to the valid image frames, e.g. calculating a displacement or an average displacement according to the N image frames to be served as an estimated displacement for an interval of the M image frames. Preferably, a value of N is larger than or equal to 4 so that the processing unit 105 is able to correctly estimate the estimated displacement for the interval of the M image frames. In one embodiment, a value of N in the low speed mode is larger than a value of N in the high speed mode so as to increase the system stability. In addition, as the interval of the M image frames is limited by the report rate of the transmission interface 106, the interval of the M image frames is preferably shorter than 8 milliseconds (in the case of 125 times/second report rate), or (M+N) is preferably lower than a quotient calculated by dividing a frame rate of the light source 101 (herein the frame rate refers to a reciprocal of a time interval between two successive lighting of the light source 101 in a speed mode) by the report rate so as to avoid error in calculating the displacement. For example when the report rate is 125 times/second, (M+N) is preferably lower than 25 in the high speed mode and (M+N) is preferably lower than 13 in the middle speed mode, wherein values referred herein are only exemplary.

Referring to FIG. 4B, through the aforementioned operating method, the light source 101 turns on 1000 times per second and the current consumption of the light source 101 in every speed mode is identical and the total power consumption herein is lower than that in FIG. 3A. In addition, as the image sensor 103 captures the image frames at its original sampling frequency within the interval of the N image frames, the maximum detectable speed here is still maintained identical to that shown in FIG. 3C.

The operating method of the displacement detection device according to the embodiment of the present disclosure includes the steps of: capturing, with an image sensor, image frames at a sampling frequency; controlling a light source to turn on at at least one lighting frequency or to turn off serially; and calculating, with a processing unit, a displacement according to the image frames captured when the light source turns on to be served as an estimated displacement for an interval during which the light source turns off.

Figure 5A:
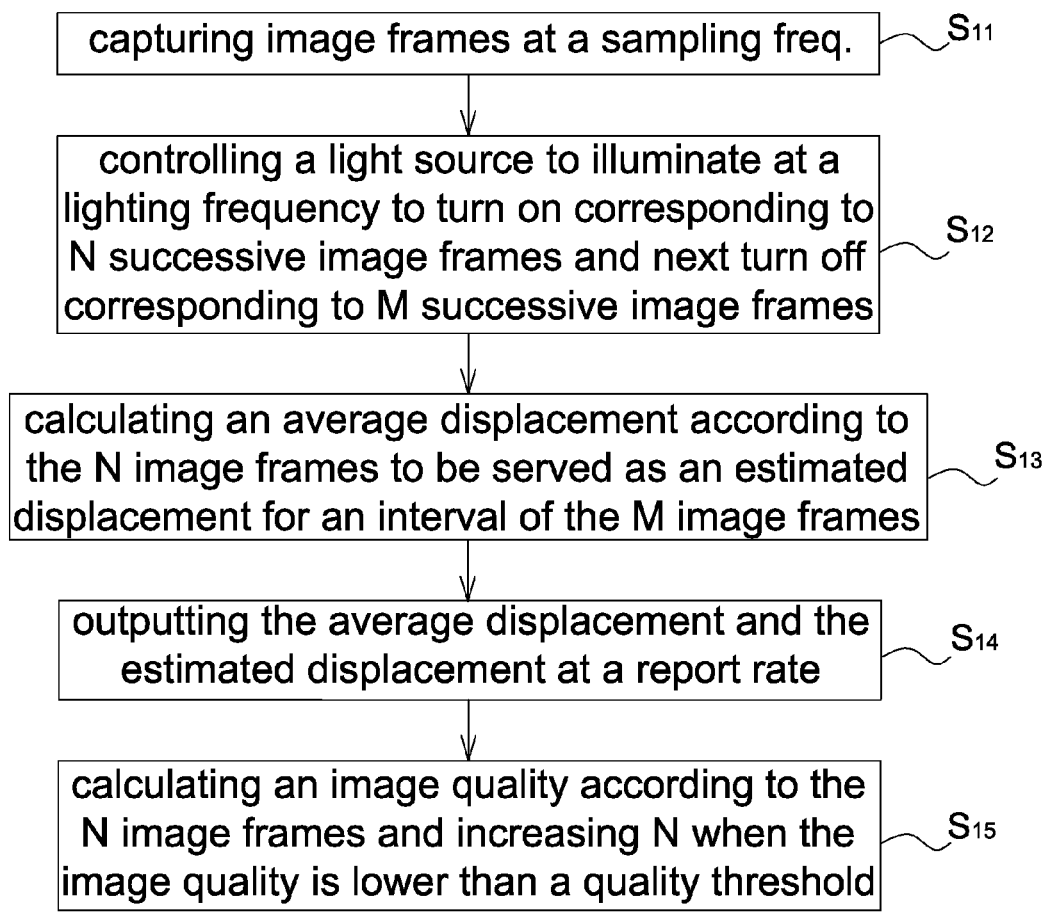
FIGS. 5A to 5B show the flow chart of the operating method of the displacement detection device according to the embodiment of the present disclosure.

Referring to FIGS. 4A and 5A, for example in one aspect the operating method of the displacement detection method of the present disclosure includes the steps of: using the image sensor 103 to capture image frames at a fixed sampling frequency (Step $S_{11}$); controlling the light source 101 to turn on at a lighting frequency corresponding to N successive image frames such that the image sensor 103 may successively capture N valid image frames and next to turn off corresponding to M successive image frames so as to reduce the consuming power of the light source 101 in an interval of the M image frames (Step $S_{12}$); and using the processing unit 105 to calculate a displacement according to the N valid image frames to be served as an estimated displacement for the interval of the M image frames (Step $S_{13}$). In this embodiment, a value of N is preferably larger than 4. The operating method may further include the steps of: outputting, using the transmission interface 106, the displacement and the estimated displacement at a report rate, wherein (M+N) is smaller than or equal to a quotient calculated by dividing a frame rate of the light source 101 by the report rate so as to prevent obtaining improper displacement (Step $S_{14}$); and calculating, using the processing unit 105, an image quality according to the N image frames and increasing a value of N when the image quality is lower than a quality threshold thereby increasing the calculation accuracy (Step $S_{15}$).

The operating method of the displacement detection method according to another embodiment of the present disclosure includes the steps of: capturing, with an image sensor, image frames at a sampling frequency; turning on a light source synchronizing to the sampling frequency; calculating, with a processing unit, a displacement according to the image frames captured by the image sensor to accordingly determine a speed mode of the light source; controlling the light source to turn on in the speed mode or to turn off serially; and calculating, with the processing unit, a displacement according to the image frames captured when the light source turns on to be served as an estimated displacement for an interval during which the light source turns off.

Figure 5B:
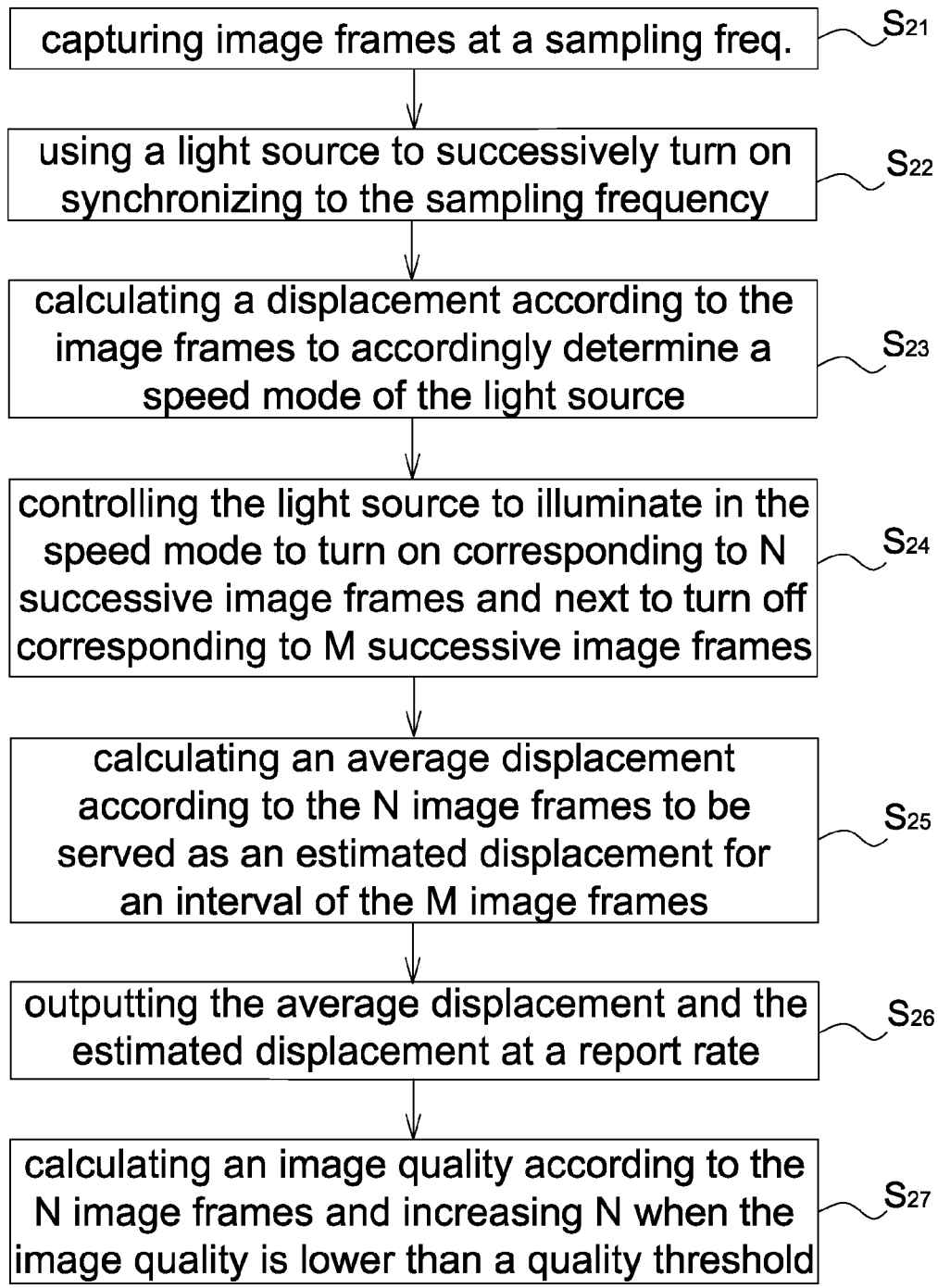

Referring to FIGS. 4A and 5B, for example in one aspect the light source 101 of the displacement detection device 10 has a plurality of speed modes and the operating method of the displacement detection device of the present disclosure includes the steps of: using the image sensor 103 to capture image frames at a fixed sampling frequency (Step $S_{21}$); using the light source 101 to successively turn on synchronizing to the sampling frequency (Step $S_{22}$); using the processing unit 105 to calculate a displacement according to the image frames captured by the image sensor 103 to accordingly determine a speed mode of the light source (Step $S_{23}$); controlling the light source 101 to illuminate in the speed mode to turn on corresponding to N successive image frames such that the image sensor 103 may successively capture N valid image frames and next to turn off corresponding to M successive image frames so as to reduce the power consumption of the light source 101 in an interval of the M image frames (Step $S_{24}$); and using the processing unit 105 to calculate a displacement according to the N valid image frames to be served as an estimated displacement for an interval of the M image frames (Step $S_{25}$). In this embodiment, the processing unit 105 may further realtimely switch the speed mode according to the displacement. In this embodiment, a value of N in the low speed mode is preferably larger than a value of N in the high speed mode so as to increase the system stability. Similarly, a value of N is preferably larger than 4 so as to increase the calculation accuracy of the displacement. This embodiment may further include the steps of: outputting, with the transmission interface 106, the displacement and the estimated displacement at a report rate, wherein (M+N) is smaller than or equal to a quotient calculated by dividing a frame rate of the light source 101 by the report rate so as to avoid obtaining improper displacement (Step $S_{26}$); and calculating, with the processing unit 105, an image quality according to the N image frames and increasing a value of N when the image quality is lower than a quality threshold so as to increase the calculation accuracy (Step $S_{27}$). It should be mentioned that the light source 101 in Step $S_{22}$ may successively turn on in any speed mode, e.g. turning on corresponding to successive 2 to 3 image frames or more than 3 image frames. In this embodiment, said valid image frames refer to the image frames captured when the light source 101 is turned on.

In the embodiments of the present disclosure, the light source 101 turns on corresponding to N successive image frames and next turns off corresponding to M successive image frames. The processing unit 105 calculates a displacement according to the image frames captured when the light source 101 turns on to be served as a reference displacement, and the reference displacement may be served as a displacement for an interval during which the light source 101 turns off.

As mentioned above, although the conventional optical mouse can save power by changing the sampling frequency or the lighting frequency, it still has the problem of low stability and fluctuated consumption current respectively.

The present disclosure further provides a displacement detection device (FIGS. 2A and 2B) and an operating method thereof (FIGS. 5A and 5B) that have identical consumption current in different speed modes and have a better stability and can effectively reduce the total consumption power.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A displacement detection device, comprising:
    a housing;
    an image sensor disposed inside the housing and configured to capture image frames at a sampling frequency;
    a light source disposed inside the housing and configured to provide, in at least one speed mode, light for the image sensor in capturing the image frames;
    a light control unit coupled to the light source and configured to control the light source with the speed mode to turn on corresponding to N successive image frames and next turn off corresponding to M successive image frames where in N and M are integers;
    a processing unit configured to calculate a displacement according to the image frames captured when the light source turns on to be served as an estimated displacement for an interval during which the light source turns off; and
    a transmission interface configured to output the displacement and the estimated displacement at a report rate, wherein (M+N) is smaller than or equal to a quotient calculated by dividing a frame rate of the light source by the report rate.

2. The displacement detection device as claimed in claim 1, wherein N is larger than or equal to 4.

3. The displacement detection device as claimed in claim 1, wherein the speed mode comprises a high speed mode and a low speed mode, and the processing unit is further configured to switch the speed mode according to the displacement.

4. The displacement detection device as claimed in claim 3, wherein a number of times the light source turns on per second is identical in the high speed mode and the low speed mode.

5. The displacement detection device as claimed in claim 3, wherein a value of N in the low speed mode is larger than a value of N in the high speed mode.

6. The displacement detection device as claimed in claim 1, wherein the processing unit is further configured to calculate an image quality of the N successive image frames and increase a value of N when the image quality is lower than a quality threshold.

7. The displacement detection device as claimed in claim 1, wherein the displacement detection device is an optical mouse or an optical finger mouse.

8. An operating method of a displacement detection device, the displacement detection device comprising a housing, an image sensor, a light source and a processing unit, the operating method comprising:
    capturing, with the image sensor disposed inside the housing, image frames at a sampling frequency;
    controlling the light source, which is disposed inside the housing, to turn on corresponding to N successive image frames and next to turn off corresponding to M successive image frames where in N and M are integers;
    calculating, with the processing unit, a displacement according to the image frames captured when the light source turns on to be served as an estimated displacement for an interval during which the light source turns off; and
    outputting, with a transmission interface, the displacement and the estimated displacement at a report rate, wherein (M+N) is smaller than or equal to a quotient calculated by dividing a frame rate of the light source by the report rate.

9. The operating method as claimed in claim 8, wherein N is larger than or equal to 4.

10. The operating method as claimed in claim 8, further comprising: calculating, with the processing unit, an image quality according to the N successive image frames and increasing a value of N when the image quality is lower than a quality threshold.

11. An operating method of a displacement detection device, the displacement detection device comprising a housing, an image sensor, a light source and a processing unit, the operating method comprising:
    capturing, with the image sensor disposed inside the housing, image frames at a sampling frequency;
    turning on the light source, which is disposed inside the housing, synchronizing to the sampling frequency;
    calculating, with the processing unit, a displacement according to the image frames captured by the image sensor to accordingly determine a speed mode of the light source;
    controlling the light source to turn on in the speed mode corresponding to N successive image frames and next to turn off corresponding to M successive image frames where in N and M are integers;
    calculating, with the processing unit, a displacement according to the image frames captured when the light source turns on to be served as an estimated displacement for an interval during which the light source turns off; and
    outputting, with a transmission interface, the displacement and the estimated displacement at a report rate, wherein (M+N) is smaller than or equal to a quotient calculated by dividing a frame rate of the light source by the report rate.

12. The operating method as claimed in claim 11, further comprising:
    real-timely switching, with the processing unit, the speed mode according to the displacement.

13. The operating method as claimed in claim 12, wherein a number of times the light source turns on per second is identical in different speed modes.

14. The operating method as claimed in claim 11, wherein the speed mode comprises a high speed mode and a low speed mode, and a value of N in the low speed mode is larger than a value of N in the high speed mode.

15. The operating method as claimed in claim 11, wherein N is larger than or equal to 4.

16. The operating method as claimed in claim 11, further comprising:

calculating, with the processing unit, an image quality according to the N successive image frames and increasing a value of N when the image quality is lower than a quality threshold.

* * * * *